US006933071B1

(12) United States Patent
Yoshitake et al.

(10) Patent No.: US 6,933,071 B1
(45) Date of Patent: Aug. 23, 2005

(54) SOLID POLYMER TYPE FUEL CELL AND PRODUCTION METHOD THEREOF

(75) Inventors: Masaru Yoshitake, Kanagawa (JP); Yasuhiro Kunisa, Kanagawa (JP); Eiji Endoh, Kanagawa (JP); Eiji Yanagisawa, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/869,327

(22) PCT Filed: Jan. 24, 2000

(86) PCT No.: PCT/JP00/00323

§ 371 (c)(1),
(2), (4) Date: Jul. 25, 2001

(87) PCT Pub. No.: WO00/44060

PCT Pub. Date: Jul. 27, 2000

(30) Foreign Application Priority Data

Jan. 25, 1999 (JP) .................................. 11-016326

(51) Int. Cl.$^7$ ............................................... H01M 4/86

(52) U.S. Cl. ............................ 429/40; 429/41; 429/42; 429/44; 429/233; 429/236; 429/245; 429/246

(58) Field of Search ............................... 429/40, 41, 42, 429/233, 236, 245, 246, 44

(56) References Cited

U.S. PATENT DOCUMENTS

| 5,733,430 A | * | 3/1998 | Ashida et al. ............... 205/337 |
| 5,795,668 A | | 8/1998 | Banerjee |
| 6,087,032 A | | 7/2000 | Yoshitake et al. |
| 6,106,965 A | * | 8/2000 | Hirano et al. ................. 429/30 |

FOREIGN PATENT DOCUMENTS

| JP | 2-24969 | * | 1/1990 |
| JP | 5-62687 | | 3/1993 |
| JP | 8-255619 | | 10/1996 |
| JP | 9-265996 | | 10/1997 |
| JP | 9-320611 | | 12/1997 |
| JP | 10-12250 | | 1/1998 |
| JP | 2000-67874 | | 3/2000 |

* cited by examiner

*Primary Examiner*—Laura Weiner
(74) *Attorney, Agent, or Firm*—Oblon, Spivak, McClelland, Maier & Neustadt, P.C.

(57) ABSTRACT

A polymer electrolyte fuel cell comprising a polymer electrolyte made of an ion exchange membrane, catalyst layers disposed on both sides thereof and current collectors disposed on the outer sides thereof, wherein a solvent-soluble fluorine-containing polymer (preferably a polymer having a fluorine-containing aliphatic ring structure) having substantially no ion exchange groups, is incorporated in the current collectors.

By the above construction, the current collectors can have a high water repellency for a long period of time, and the polymer electrolyte fuel cell can operate at a high output density constantly over a long period of time.

20 Claims, No Drawings

SOLID POLYMER TYPE FUEL CELL AND PRODUCTION METHOD THEREOF

TECHNICAL FIELD

The present invention relates to a polymer electrolyte fuel cell employing specific current collectors and a method for its production.

BACKGROUND ART

Attention has been drawn to a hydrogen oxygen fuel cell as a power generation system which gives no substantial adverse effect to the global environment, since the reaction product is only water in principle. With a polymer electrolyte fuel cell which is being studied recently, a very high output is expected at a low operation temperature of from room temperature to about 150° C. In such a case, it is assumed to use, as a fuel, hydrogen gas containing e.g. carbon dioxide, obtained by reforming e.g. methane, methanol or gasoline.

On the other hand, a polymer electrolyte fuel cell has a low operation temperature. Accordingly, exhaust heat can hardly be utilized, for example, as an auxiliary power, and it is utilized only for hot water at best. To offset such a drawback, it is necessary for the polymer electrolyte fuel cell to secure a high output density. Further, for practical application, it is required to secure performance of a high energy efficiency and a high output density even under an operation condition where the fuel and air utilization ratios are high.

As the electrolyte for the polymer electrolyte fuel cell, a perfluorocarbon sulfonic acid type cation exchange membrane, which is an ultrastrong acid, is mainly used, in view of the chemical stability and electric conductivity. When such an acid electrolyte is used, the following reaction occurs at an air electrode, whereby water will be formed.

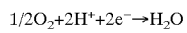

$$1/2O_2 + 2H^+ + 2e^- \rightarrow H_2O$$

Therefore, when the polymer electrolyte fuel cell is operated under such conditions as a low operation temperature, a high current density and a high gas utilization ratio, clogging (flooding) of the electrode is likely to take place due to condensation of steam, at the air electrode where water is formed. Further, gases to be supplied to the fuel electrode and the air electrode, are usually wetted not to dry the ion exchange membrane in order to maintain the electric conductivity of the ion exchange membrane which is the polymer electrolyte. Accordingly, also by such wetted gases, flooding of the electrode is likely to take place.

Accordingly, in order to obtain a stable performance of the fuel cell for a long period of time, it is necessary to impart water repellency to the catalyst layers and the current collectors to supply gases to the catalyst layers, so as to prevent such flooding. Particularly in the case of a polymer electrolyte fuel cell whereby a high output density at a low temperature is desired, it is important to secure sufficient gas supply to the catalyst layers by imparting water repellency to the current collectors.

For example, as a method for imparting water repellency to a current collector made of e.g. carbon paper or carbon cloth, a method of incorporating a fluorine-containing polymer to a current collector, has heretofore been known. The fluorine-containing polymer may, for example, be polytetrafluoroethylene (hereinafter referred to as PTFE), a tetrafluoroethylene/hexafluoropropylene copolymer or a tetrafluoroethylene/perfluoro(alkyl vinyl ether) copolymer. Each of them is a resin not soluble in a solvent. In this specification, an A/B copolymer represents a copolymer comprising polymer units based on A and polymer units based on B.

In order to incorporate such a fluorine-containing polymer as a water repellent material to a current collector, a method may, for example, be employed in which a sheet constituting a current collector is impregnated in a dispersion of a powder of a fluorine-containing polymer, followed by baking at a temperature of about 300° C. Usually, a surfactant is used as a dispersing agent for such a dispersion of a fluorine-containing polymer, and the surfactant is removed by baking. The surfactant is a hydrophilic substance, and therefore, if it is not sufficiently removed, no adequate water repellent effect by the fluorine-containing polymer can be obtained.

In the above method, high temperature baking is required, whereby there will be many restrictions in the design of the electrodes. For example, a catalyst layer usually contains an ion exchange resin for coating the catalyst, and the heat resistant temperature of such an ion exchange resin is about 200° C. Therefore, the above-mentioned baking treatment can not be applied in a state where a catalyst layer is laminated on the current collector, and the current collector will have to be baked alone.

Further, the particle size of the above-mentioned solvent-insoluble fluorine-containing polymer is at least 0.1 µm as a primary particle size, and when it is used as a powder, it is usually granulated, whereby the average secondary particle size is usually at a level of from a few µm to 500 µm. Accordingly, when such a solvent-insoluble fluorine-containing polymer is incorporated to a current collector, if the amount is small, it can not be continuously present, and the current collector will have water repellency only locally.

Therefore, portions of the current collector where no fluorine-containing polymer is present, will gradually be wetted as the fuel cell is used, and wetted regions will spread therefrom, thus leading to a substantial decrease in the water repellency of the entire current collector. Consequently, pores of the current collector will be clogged by water, and there will be a problem that the supply of a gas to the catalyst layer is hindered, and the concentration overpotential increases to substantially lower the output voltage. Further, the above-mentioned fluorine-containing polymer is substantially spherical in its shape, and even when subjected to baking treatment, the bonding strength to the sheet which constitutes the current collector, is weak, whereby there will be also a problem that the fluorine-containing polymer is likely to partially fall off when used for a long period of time.

Therefore, in order to impart adequate water repellency continuously over the entire current collector, a large amount of the fluorine-containing polymer will be required. However, the above-mentioned solvent-insoluble fluorine-containing polymer is electrically insulating, and if it is incorporated in a large amount in the current collector, the resistance of the current collector increases. Further, there is a problem that the fluorine-containing polymer particles themselves are likely to clog the pores of the current collector.

Therefore, it is an object of the present invention to provide a current collector for a polymer electrolyte fuel cell, which has high water repellency as compared with the prior art and which is capable of maintaining adequate water repellency for a long period of time, thereby to provide a polymer electrolyte fuel cell which has a high output density and which provides a stabilized performance for a long period of time.

DISCLOSURE OF THE INVENTION

The present invention provides a polymer electrolyte fuel cell comprising a polymer electrolyte made of an ion exchange membrane, catalyst layers disposed on both sides thereof, and current collectors disposed on the outer sides of the catalyst layers, wherein the current collectors are made of a porous sheet having a solvent-soluble fluorine-containing polymer having substantially no ion exchange groups, deposited on its surface.

Further, the present invention provides a method for producing a polymer electrolyte fuel cell, which comprises disposing catalyst layers on both sides of a polymer electrolyte made of an ion exchange membrane, and further disposing current collectors made of a porous sheet on the outer sides of the catalyst layers, wherein the current collectors are obtained by impregnating or spraying a solution having a solvent-soluble fluorine-containing polymer having substantially no ion exchange groups, dissolved in a solvent, to the porous sheet, to deposit the fluorine-containing polymer on the porous sheet.

BEST MODE FOR CARRYING OUT THE INVENTION

The current collectors in the present invention contain a solvent-soluble fluorine-containing polymer having substantially no ion exchange groups, so that they have water repellency. In this specification, the solvent-soluble fluorine-containing polymer is a fluorine-containing polymer such that a solvent capable of dissolving the fluorine-containing polymer, exists, and the solvent is not particularly limited. However, it is preferably a fluorine-containing polymer which does not substantially dissolve in a solvent such as water or an alcohol which will be a reactant or a product in the electrode reaction of the fuel cell.

The solvent-soluble fluorine-containing polymer in the present invention may be one partially fluorinated or one wherein all hydrogen atoms are fluorinated. However, it is preferably in a solid state within the temperature range for use of a polymer electrolyte fuel cell. Specifically, it is preferably in a solid state within a range of from room temperature to 150° C.

Further, the solvent-soluble fluorine-containing polymer in the present invention has substantially no ion exchange groups. Here, the ion exchange groups are specifically sulfonic acid groups, carboxylic acid groups, etc. Here, "have substantially no ion exchange groups" means that the ion exchange groups contained in the solvent-soluble fluorine-containing polymer are at most 0.1 meq./g dry resin, particularly preferably at most 0.05 meq./g dry resin.

As such a solvent-soluble fluorine-containing polymer, a polymer having a fluorine-containing aliphatic ring structure in its molecule, is preferred. The polymer having a fluorine-containing aliphatic ring structure in its molecule, is hardly crystallizable due to twisting of the molecule attributable to its molecular structure and is soluble in a fluorine type solvent. The polymer having a fluorine-containing aliphatic ring structure in its molecule, may, for example, be a polymer containing polymer units represented by the following formula 1, 2, 3 or 4. Specifically, a fluorine-containing polymer containing polymer units represented by any one of the following formulae 5 to 11, is preferred. Further, a fluorine-containing polymer containing polymer units represented by the formula 12 or 13, is also preferred.

In the formula 1, $R^1$ is a fluorine atom or a trifluoromethyl group, p is an integer of from 0 to 5, q is an integer of from 0 to 4, r is 0 or 1, and p+q+r is from 1 to 6; in the formula 2, each of s, t and u which are independent of one another, is an integer of from 0 to 5, and s+t+u is from 1 to 6; in the formula 3, each of $R^2$ and $R^3$ which are independent of each other, is a fluorine atom or a trifluoromethyl group; and in the formula 4, v is 1 or 2.

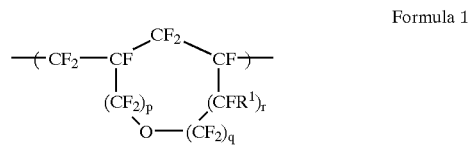

Formula 1

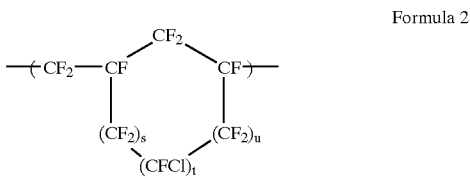

Formula 2

Formula 3

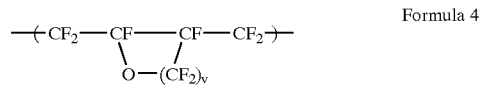

Formula 4

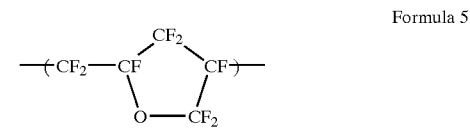

Formula 5

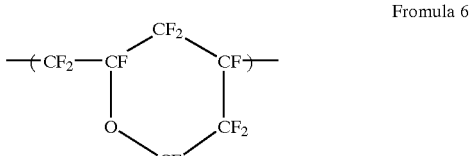

Fromula 6

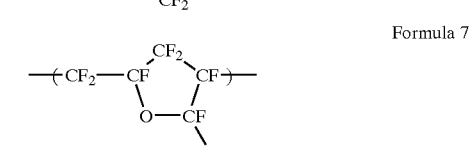

Formula 7

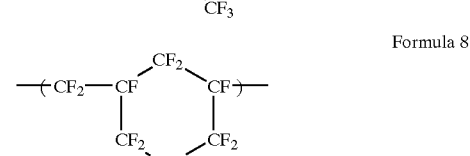

Formula 8

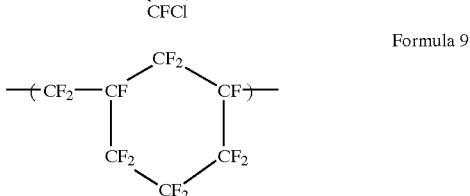

Formula 9

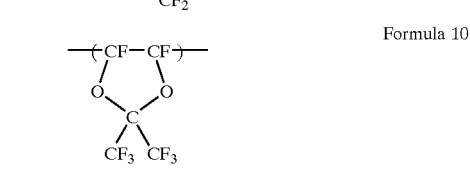

Formula 10

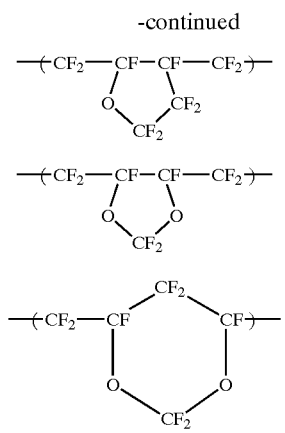

As the solvent-soluble fluorine-containing polymer in the present invention, a homopolymer of polymer units represented by any one of the formulae 5 to 13 is preferred, but a copolymer containing at least two types of these polymer units, is also preferred. Further, it may be a copolymer containing polymer units based on a monomer having no fluorine-containing ring structure, such as tetrafluoroethylene or hexafluoropropylene.

The solvent which is capable of dissolving such a fluorine-containing polymer, is mainly a fluorine-containing solvent. For example, perfluorobenzene, dichloropentafluoropropane, Afluide (tradename, for a fluorine-containing solvent, manufactured by Asahi Glass Company, Limited) or perfluoro (2-butyltetrahydrofuran) may be mentioned. The concentration of the solution having the fluorine-containing polymer dissolved, may be from 0.01 to 50%, based on the total mass of the solution.

Further, the molecular weight of the solvent-soluble fluorine-containing polymer in the present invention is preferably from about 2,000 to 200,000, particularly from about 5,000 to 10,000. With a solution of the fluorine-containing polymer, if the mass concentration is equal, a solution having one having a large molecular weight dissolved usually has a high viscosity. When a solvent-soluble fluorine-containing polymer having a molecular weight within the above-mentioned range, is used, if the concentration of the solution having such a polymer dissolved in a solvent, is adjusted, it is possible to bring the viscosity to a level excellent in the penetrability into the porous sheet constituting a current collector. Accordingly, a water repellency can be imparted easily to the above sheet by impregnating the sheet in this solution or by spraying this solution to the sheet. Further, the solution of the solvent-soluble fluorine-containing polymer having a molecular weight within the above range, has a film-forming property, and a coating film obtainable by drying the solution, is excellent also in the durability.

In the present invention, in order to increase the physical adhesive strength of the solvent-soluble fluorine-containing polymer to the porous sheet constituting the current collectors, it is preferred that the fluorine-containing polymer solution is incorporated to the sheet by a method such as spraying or impregnation, followed by baking at a temperature of from about 100 to 250° C., more preferably from 150 to 200° C. The baking atmosphere at that time is not particularly limited, but is preferably in vacuum or in an inert gas atmosphere. The fluorine-containing polymer solution does not contain e.g. a surfactant to be removed, whereby the adhesive strength to the sheet can be improved at a temperature lower than the decomposition temperature of the ion exchange resin. Accordingly, baking may be carried out after integrating the current collectors with the catalyst layers. Further, the solvent-soluble fluorine-containing polymer is preferably such that hydrogen atoms are all fluorinated, whereby it is excellent in the chemical resistance and stable even in an oxidizing or reducing atmosphere.

In the present invention, the solvent-soluble fluorine-containing polymer is incorporated to the current collectors, and it is further preferred that the solvent-soluble fluorine-containing polymer is incorporated also in the catalyst layers. If the solvent-soluble fluorine-containing polymer is incorporated to the catalyst layers, the water repellency will further be improved, whereby flooding can be more effectively suppressed. Accordingly, a higher output can be maintained even if the fuel cell is used for a long period of time. Here, the solvent-soluble fluorine-containing polymer to be incorporated to the catalyst layers may be the same or different from the solvent-soluble fluorine-containing polymer incorporated to the current collectors, but it is preferably a solvent-soluble fluorine-containing polymer exemplified above with respect to the current collectors.

In the present invention, the porous sheet constituting the current collectors is preferably made of a carbonaceous material, and carbon paper or carbon cloth (one having carbon fibers formed into a cloth) is, for example, preferred. Of such a porous sheet, the thickness is preferably from 0.1 to 1 mm, and the porosity is preferably from 30 to 90%, particularly preferably from 70 to 80%. If the current collectors are too thick, the dispersibility of the gas deteriorates, and the output of the fuel cell is likely to deteriorate. Further, if the porosity is too low, the gas will not be efficiently supplied to the catalyst layers. Further, if the thickness of the current collectors is too thin or the porosity is too high, the strength of the current collectors tends to be low.

In the polymer electrolyte fuel cell of the present invention, the catalyst layers are disposed on both sides of the polymer electrolyte made of an ion exchange membrane, and the current collectors are disposed on the outer sides thereof. The current collectors may be disposed as directly in contact with the catalyst layers or may be disposed as in contact via a gas diffusion layer.

As such a gas diffusion layer, a water repellent sheet made of fine particles of carbon and PTFE may, for example, be used. To the gas diffusion layer, water repellency may be imparted together with the current collector. When a gas diffusion layer is present between the current collector and the catalyst layer, the gas can be supplied more uniformly to the catalyst layer. Further, when the current collectors are made of e.g. carbon paper, the catalyst layers or ion exchange membranes are likely to be damaged by e.g. fluffing, but by the presence of the gas diffusion layer, such damage can be prevented.

As a method for incorporating the solvent-soluble fluorine-containing polymer to the current collectors, a method may, for example, be mentioned wherein a porous sheet to constitute a current collector, is impregnated in a solution having the fluorine-containing polymer dissolved, followed by removing the solvent. Otherwise, in the process for the production of the above porous sheet, its constituting material may be impregnated in the fluorine-containing polymer solution. Otherwise, the above porous sheet may be put together with a catalyst layer and impregnated together in a fluorine-containing polymer solution. The solution of the solvent-soluble fluorine-containing polymer is not required to use a surfactant, and simply by heating at a temperature where the solvent can be removed, the fluorine-containing polymer can be deposited on the current collectors to impart water repellency.

Further, the solvent which is capable of dissolving the solvent-soluble fluorine-containing polymer, is usually a fluorine-containing carbon type solvent, and in many cases one having a low boiling point of not higher than 60° C. Accordingly, a solvent having such a low boiling point can be removed simply by leaving the porous sheet containing the fluorine-containing polymer solution to stand at room temperature, whereby the porous sheet can be made water repellent very simply.

Further, the fluorine-containing polymer can be incorporated into the current collectors in the form of a solution, whereby by adjusting the viscosity of the solution, the fluorine-containing polymer can be distributed uniformly even into the interior of the pores of the porous sheet constituting the current collector. Accordingly, by means of the solvent-soluble fluorine-containing polymer, the porous sheet surface can be covered efficiently with a small amount as compared with a fluorine-containing polymer which is insoluble in a solvent. Further, even when the water repellency of the current collectors has deteriorated by the use of the fuel cell for a long period of time, the water repellency can be imparted again to the current collectors by an operation such as a spraying of the fluorine-containing polymer solution, as the case requires.

In the present invention, a solution having the fluorine-containing polymer dissolved, is used, whereby the fluorine-containing polymer present after the removal of the solvent upon drying, can cover the surface of the sheet, irrespective of the type of the porous sheet constituting the current collectors, such as woven fabric or non-woven fabric, and irrespective of the sizes of pores of the sheet. Accordingly, it is possible to impart high water repellency to any sheet having a porous structure.

Further, the solvent-soluble fluorine-containing polymer in the present invention is incorporated to the current collectors preferably in an amount of from 0.001 to 60%, particularly preferably from 0.01 to 10%, based on the total mass of the current collectors. Within this range, the current collectors will have excellent water repellency over a long period of time.

Further, when the porous sheet to constitute the current collectors, is treated for water reppelency, the viscosity of the fluorine-containing polymer solution may be adjusted by a diluting solvent. As such a diluting solvent, a fluoroalkane, a fluorotrialkylamine, a fluoroalkyltetrahydrofuran, a ketone, an ester, a chloroethane, a benzene derivative, an alcohol such as methanol, ethanol or isopropyl alcohol, a fluorocarbon, a hydrofluorocarbon or a hydrochlorofluorocarbon, may, for example, be mentioned.

The current collectors in the present invention are excellent not only in the initial water repellency, but the water repellency can be maintained even when it is used for a long period of time, whereby the output of the fuel cell can be maintained at a high output level constantly for a long period of time. Further, the water repellency can be imparted more efficiently than ever, whereby the amount of the fluorine-containing polymer as an insulating resin contained in the current collectors, can be reduced. Accordingly, the electric resistance of the current collectors can be reduced, and the porosity of the current collectors can be increased. Thus, the current collectors in the present invention are excellent in the gas diffusion property, and have a low resistanece, and they are useful for both an air electrode and a fuel electrode.

In the present invention, the above current collectors can be used for either air electrodes or fuel electrodes, or they may be used for both electrodes. However, at the air electrodes, water will form by the reaction, and flooding is likely to occur, and accordingly, at least for the air electrodes, it is preferred to use them. Even when the above current collectors are used only for the air electrodes, and current collectors having water repellency treatment applied by a conventional solvent-insoluble fluorine-containing polymer, are used for the fuel electrodes, it is possible to provide a fuel cell having a long term reliability. Further, even when the solvent-insoluble fluorine-containing polymer and the solvent-soluble fluorine-containing polymer according to the present invention, are used in combination and incorporated together in the current collectors, it is possible to obtain current collectors having high water repellency for a long period of time.

Now, the present invention will be described in detail with reference to Examples (Examples 1 to 4) and Comparative Examples (Examples 5 and 6), but the present invention is by no means restricted thereto.

EXAMPLE 1

A polymer (hereinafter referred to as the polymer P) comprising polymer units represented by the formula 11 and having a molecular weight of about 100,000, was dissolved in a solvent mixture of perfluoro (2-butyltetrahydrofuran) and perfluoro (tributylamine) in a mass ratio of 1:1, so that the concentration of the solute would be 2% of the total mass. In this solution, carbon paper (TGP-H-060, tradename, manufactured by Toray Industries Inc.) was impregnated, whereby the above polymer was deposited so that it would be present in an amount of 0.6 mg/cm$^2$ per unit area of the carbon paper. This carbon paper was dried at room temperature (25° C.) to remove the solvent, thereby to obtain a current collector.

A catalyst having platinum supported on a carbon black powder in an amount of 40% of the total mass, and a solution having an ion exchange resin made of a $CF_2$=$CF_2$/$CF_2$=CF—$OCF_2CF$ ($CF_3$)—$OCF_2CF_2SO_3H$ copolymer having an ion exchange capacity of 1.1 meq./g dry resin dispersed in a solvent mixture of ethanol and 1,3-dichloro-1,1,2,2,3-pentafluoropropane in a mass ratio of 1:1, were mixed to obtain a dispersion A. In this dispersion A, the mass ratio of the catalyst to the ion exchange resin was 0.75:0.25.

Then, a solution having a catalyst dispersed was prepared in the same manner as for the dispersion A except that as the ion exchange resin, one having an ion exchange capacity of 0.91 meq./g dry resin, was used, and this liquid was designated as a dispersion B.

As an electrolyte membrane, an ion exchange membrane of a perfluorosulfonic acid type (Flemion R, tradename, manufactured by Asahi Glass Company, Limited, ion exchange capacity: 1.0 meq./g dry resin, dried film thickness: 50 μm) was used. To this ion exchange membrane, the dispersion A was sprayed to the hydrogen electrode side, and the dispersion B was sprayed to the air electrode side, so that the platinum content would, respectively, be 0.5 mg/cm$^2$, to form catalyst layers, thereby to obtain a membrane electrode assembly having catalyst layers formed on both sides of the ion exchange membrane. This assembly was sandwiched between a pair of the above current collectors and assembled in a cell to obtain a single cell.

Using this single cell, a continuous operation was carried out at a constant current of 1.0 A/cm$^2$ at a cell temperature of 80° C. under a normal pressure (0.1 MPa) with a supplied gas being hydrogen/air at a gas utilization ratios of 70% of hydrogen and 40% of air. The output voltages upon expiration of 10 hours, 500 hours and 1000 hours after the initiation of the operation, were measured. The results are shown in Table 1.

EXAMPLE 2

The current collectors obtained in Example 1 were baked in vacuum at 150° C. for one hour. A single cell was obtained in the same manner as in Example 1 except that the baking treated current collectors were employed. Using this single cell, the operation was carried out in the same manner as in Example 1, and the output voltages were measured in the same manner as in Example 1. The results are shown in Table 1.

EXAMPLE 3

The polymer P was dissolved in a solvent mixture of perfluoro (2-butyltetrahydrofuran) and perfluoro (tributylamine) in a mass ratio of 1:1, so that the concentration of the solute would be 0.5% of the total mass. In this solution, carbon paper (TGP-H-060, tradename, manufactured by Toray Industries Inc.) was impregnated, whereby the above polymer was deposited so that it was present in an amount of 0.3 mg/cm$^2$ per unit area of the carbon paper. This carbon paper was baked at 150° C. for one hour, to obtain a current collector.

A single cell was prepared in the same manner as in Example 1 except that this current collector was employed, and using this single cell, the operation was carried out in the same manner as in Example 1, and the output voltages were measured in the same manner as in Example 1. The results are shown in Table 1.

EXAMPLE 4

The polymer P was dissolved in the dispersion B, and this was designated as a dispersion C. The mass ratio of the catalyst, the ion exchange resin and the polymer P in this dispersion C was 0.72:0.24:0.04. A membrane electrode assembly was prepared in the same manner as in Example 1 except that on the air electrode side, the dispersion C was used instead of the dispersion B.

A single cell was prepared in the same manner as in Example 1 by using the current collectors obtained in Example 2 as the current collectors and using the above membrane electrode assembly. By using this single cell, the operation was carried out in the same manner as in Example 1, and the output voltages were measured in the same manner as in Example 1. The results are shown in Table 1.

EXAMPLE 5

A current collector was obtained in the same manner as in Example 1 except that the solution in which the carbon paper was impregnated, was a diluted solution of a solvent-insoluble PTFE dispersion (AD-1, tradename, manufactured by Asahi ICI Fluoropolymers Co., Ltd.) and baking was carried out in nitrogen atmosphere at 350° C. Further, the amount of PTFE deposited per unit area of the current collector was 0.6 mg/cm$^2$. A single cell was obtained in the same manner as in Example 1 except that this current collector was used. Using this single cell, the operation was carried out in the same manner as in Example 1, and the output voltages were measured in the same manner as in Example 1. The results are shown in Table 1.

EXAMPLE 6

A single cell was obtained in the same manner as in Example 1 by using the membrane electrode assembly obtained in Example 4 and the current collector obtained in Example 5. Using this single cell, the operation was carried out in the same manner as in Example 1, and the output voltages were measured in the same manner as in Example 1. The results are shown in Table 1.

TABLE 1

| | Output voltage of the single cell (V) | | |
|---|---|---|---|
| | After 10 hours | After 500 hours | After 1000 hours |
| Example 1 | 0.59 | 0.57 | 0.55 |
| Example 2 | 0.59 | 0.58 | 0.57 |
| Example 3 | 0.58 | 0.56 | 0.55 |
| Example 4 | 0.61 | 0.61 | 0.60 |
| Example 5 | 0.58 | 0.54 | 0.49 |
| Example 6 | 0.59 | 0.56 | 0.53 |

INDUSTRIAL APPLICABILITY

In the present invention, a solvent-soluble fluorine-containing polymer is used, whereby by its solution, a porous sheet to constitute a current collector can be treated for water repellency. Accordingly, the surface of the porous sheet can be covered by the fluorine-containing polymer efficiently with a small amount irrespective of the shape or the pore structure of the porous sheet. Further, by simply removing the solvent from the porous sheet having the fluorine-containing polymer solution incorporated, excellent water repellency can be uniformly imparted for a long period of time. Further, heating at a high temperature is not required for the process for imparting water repellency by incorporating the solvent-soluble fluorine-containing polymer to the current collector, the degree of freedom in designing the gas diffusion electrode containing the current collector, is high.

In the present invention, current collectors having low resistance and high water repellency for a long period of time, thus obtainable, are used, whereby it is possible to provide a polymer electrolyte fuel cell which provides a high output density and which undergoes little deterioration with time of the output characteristics.

What is claimed is:

1. A polymer electrolyte fuel cell comprising a polymer electrolyte which comprises an ion exchange membrane, catalyst layers disposed on both sides thereof, and current collectors disposed on the outer sides of said catalyst layers, wherein said current collectors comprise a porous sheet which comprises a solvent-soluble fluorine-containing polymer having substantially no ion exchange groups, deposited on a surface thereof, wherein said porous sheet has a thickness of from 0.1 to 1 mm and a porosity of from 30 to 90%, and wherein said solvent-soluble fluorine-containing polymer is a polymer having a fluorine-containing aliphatic ring structure.

2. The polymer electrolyte fuel cell according to claim 1, wherein said fluorine-containing polymer is present in an amount of from 0.001 to 60% based on the total mass of said current collectors.

3. The polymer electrolyte fuel cell according to claim 1, wherein said porous sheet comprises a carbonaceous material.

4. The polymer electrolyte fuel cell according to claim 1, wherein said fluorine-containing polymer comprises polymer units represented by any one of Formula 5 to Formula 13:

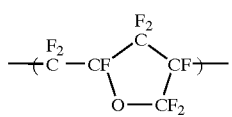
Formula 5

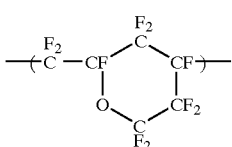
Formula 6

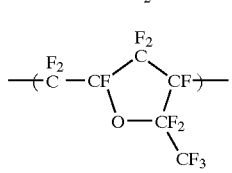
Formula 7

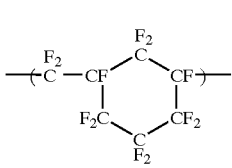
Formula 8

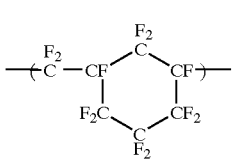
Formula 9

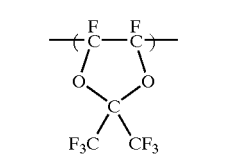
Formula 10

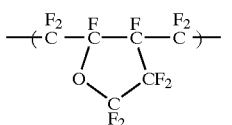
Formula 11

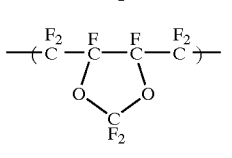
Formula 12

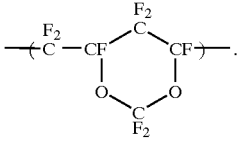
Formula 13

5. The polymer electrolyte fuel cell according to claim 4, wherein said fluorine-containing polymer is present in an amount of from 0.001 to 60% based on the total mass of said current collectors.

6. The polymer electrolyte fuel cell according to claim 4, wherein said porous sheet comprises a carbonaceous material.

7. A polymer electrolyte fuel cell comprising a polymer electrolyte which comprises an ion exchange membrane, catalyst layers disposed on both sides thereof, and current collectors disposed on the outer sides of said catalyst layers, wherein said current collectors comprise a porous sheet which comprises a solvent-soluble fluorine-containing polymer having substantially no ion exchange groups, deposited on a surface thereof, wherein said porous sheet has a thickness of from 0.1 to 1 mm and a porosity of from 30 to 90%, and wherein said fluorine-containing polymer is present in an amount of from 0.001 to 60% based on the total mass of the said current collectors.

8. A polymer electrolyte fuel cell comprising a polymer electrolyte which comprises an ion exchange membrane, catalyst layers disposed on both sides thereof, and current collectors disposed on the outer sides of said catalyst layers, wherein said current collectors comprise a porous sheet which comprises a solvent-soluble fluorine-containing polymer having substantially no ion exchange groups, deposited on a surface thereof, wherein said porous sheet has a thickness of from 0.1 to 1 mm and a porosity of from 30 to 90%, and wherein said porous sheet comprises a carbonaceous material.

9. A polymer electrolyte fuel cell comprising a polymer electrolyte which comprises an ion exchange membrane, catalyst layers disposed on both sides thereof, and current collectors disposed on the outer sides of said catalyst layers, wherein said current collectors comprise a porous sheet which comprises a solvent-soluble fluorine-containing polymer having substantially no ion exchange groups, deposited on a surface thereof, wherein said porous sheet has a thickness of from 0.1 to 1 mm and a porosity of from 30 to 90%, and said fluorine-containing polymer comprises polymer units represented by any one of Formula 5 to Formula 13:

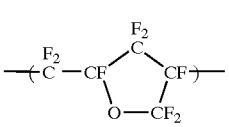
Formula 5

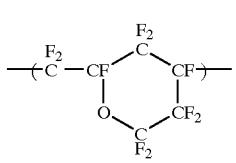
Formula 6

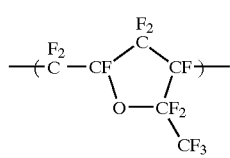
Formula 7

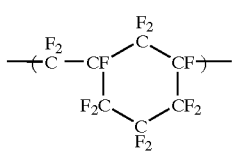
Formula 8

-continued

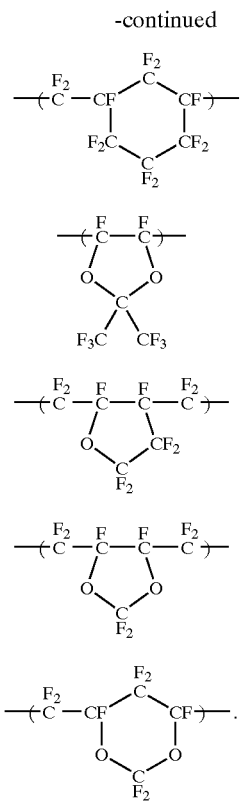

Formula 9

Formula 10

Formula 11

Formula 12

Formula 13

10. A polymer electrolyte fuel cell comprising a polymer electrolyte which comprises an ion exchange membrane, catalyst layers disposed on both sides thereof, and current collectors disposed on the outer sides of said catalyst layers, wherein said current collectors comprise a porous sheet which comprises a solvent-soluble fluorine-containing polymer having substantially no ion exchange groups, deposited on a surface thereof, wherein said solvent-soluble fluorine-containing polymer is a polymer having a fluorine-containing aliphatic ring structure, and comprises polymer units represented by

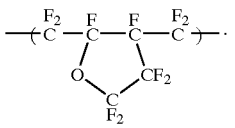

Formula 11

11. The polymer electrolyte fuel cell according to claim 10, wherein said porous sheet has a thickness of from 0.1 to 1 mm and a porosity of from 30 to 90%.

12. The polymer electrolyte fuel cell according to claim 10, wherein said fluorine-containing polymer is present in an amount of from 0.001 to 60% based on the total mass of said current collectors.

13. The polymer electrolyte fuel cell according to claim 10, wherein said porous sheet comprises a carbonaceous material.

14. A method for producing a polymer electrolyte fuel cell, which comprises disposing catalyst layers on both sides of a polymer electrolyte comprising an ion exchange membrane, and disposing current collectors comprising a porous sheet on the outer sides of said catalyst layers, wherein said current collectors are prepared by impregnating or spraying a solution having a solvent-soluble fluorine-containing polymer having substantially no ion exchange groups, dissolved in a solvent, to said porous sheet, to deposit said fluorine-containing polymer on said porous sheet, wherein said solvent is a fluorine-containing solvent, and the concentration of the solute in said solution is from 0.01 to 50% based on the total mass of said solution.

15. The method for producing a polymer electrolyte fuel cell according to claim 14, further comprising heating said porous sheet at a temperature of from 100 to 250° C. after said impregnating or spraying step.

16. The method for producing a polymer electrolyte fuel cell according to claim 14, wherein said solvent-soluble fluorine-containing polymer is a polymer having a fluorine-containing aliphatic ring structure.

17. The method for producing a polymer electrolyte fuel cell according to claim 14, wherein said fluorine-containing polymer comprises polymer units represented by any one of Formula 5 to Formula 13:

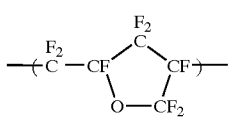

Formula 5

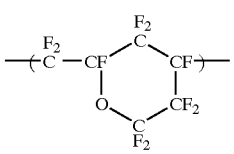

Formula 6

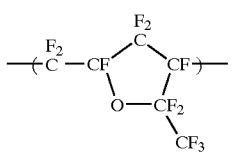

Formula 7

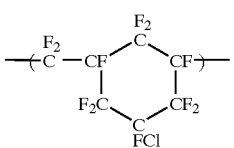

Formula 8

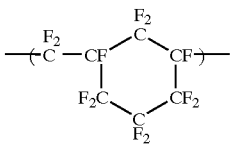

Formula 9

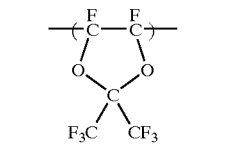

Formula 10

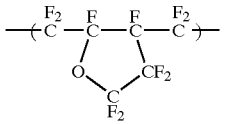

Formula 11

-continued

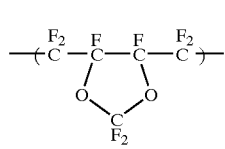

Formula 12

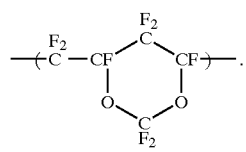

Formula 13

18. A method for producing a polymer electrolyte fuel cell, which comprises
disposing catalyst layers on both sides of a polymer electrolyte which comprises an ion exchange membrane, and
disposing current collectors which comprises a porous sheet on the outer sides of said catalyst layers,
wherein said current collectors are prepared by impregnating or spraying a solution having a solvent-soluble fluorine-containing polymer having substantially no ion exchange groups, dissolved in a solvent, to said porous sheet, to deposit said fluorine-containing polymer on said porous sheet, wherein said fluorine-containing polymer comprises polymer units represented by

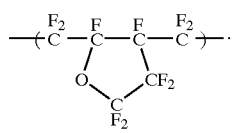

Formula 11

19. The method according to claim 18, wherein the concentration of the solute in said solution is from 0.01 to 50% based on the total mass of said solution.

20. The method according to claim 18, further comprising heating said porous sheet at a temperature of from 100 to 250° C. after said impregnating or spraying step.

* * * * *